United States Patent
Frank

(10) Patent No.: US 9,598,944 B2
(45) Date of Patent: Mar. 21, 2017

(54) ENZYME ENHANCED OIL RECOVERY

(75) Inventor: Soren Frank, Doha (QA)

(73) Assignee: Maersk Olie og Gas A/S (DK)

( * ) Notice: Subject to any disclaimer, the term of this patent is extended or adjusted under 35 U.S.C. 154(b) by 24 days.

(21) Appl. No.: 14/116,654

(22) PCT Filed: May 10, 2012

(86) PCT No.: PCT/DK2012/050158
§ 371 (c)(1),
(2), (4) Date: Nov. 8, 2013

(87) PCT Pub. No.: WO2012/152285
PCT Pub. Date: Nov. 15, 2012

(65) Prior Publication Data
US 2014/0083693 A1    Mar. 27, 2014

Related U.S. Application Data
(60) Provisional application No. 61/484,519, filed on May 10, 2011.

(30) Foreign Application Priority Data

May 10, 2011 (DK) ................................ 2011 00362

(51) Int. Cl.
*E21B 43/16* (2006.01)
*E21B 43/20* (2006.01)
*C09K 8/582* (2006.01)

(52) U.S. Cl.
CPC .............. *E21B 43/16* (2013.01); *C09K 8/582* (2013.01); *E21B 43/20* (2013.01)

(58) Field of Classification Search
None
See application file for complete search history.

(56) References Cited

U.S. PATENT DOCUMENTS 3,288,211 A * 11/1966 Johnston ........................ 166/246
3,363,684 A * 1/1968 Miller ............................ 166/275
(Continued)

FOREIGN PATENT DOCUMENTS

| WO | 2009136151 A2 | 11/2009 | |
| WO | WO2009136151 | * 11/2009 | ............. E21B 43/25 |
| WO | 2010008750 A2 | 1/2010 | |

OTHER PUBLICATIONS

Masters et al.; Introduction to Environmental Engineering and Science; Chapter 1; Materials Balance; 2007; pp. 5-11; http://web.cecs.pdx.edu/~fishw/ESR320__MassBalances.pdf.*

(Continued)

*Primary Examiner* — Angela M DiTrani
*Assistant Examiner* — Anuradha Ahuja
(74) *Attorney, Agent, or Firm* — St. Onge Steward Johnston and Reens, LLC

(57) ABSTRACT

A method for enhanced oil recovery in an underground reservoir involving use of system including at least one injection well having an injection pump for establishing an injection stream, the injection pump includes a carrier system and an enzyme system; at least one production well having at least one fluid output; a mixed injection stream through the at least one injection well including a first injection stream having a flow rate $S_1$ produced by the carrier system and a second injection stream having a flow rate $S_2$ produced by the enzyme system; a concentration of enzyme $C_{en,3}$ in the mixed injection stream established using the formula $$C_{en,3} = \left( \frac{C_{en,1} \cdot S_1 + C_{en,2} \cdot S_2}{S_1 + S_2} \right),$$

(Continued)

Figure 1:
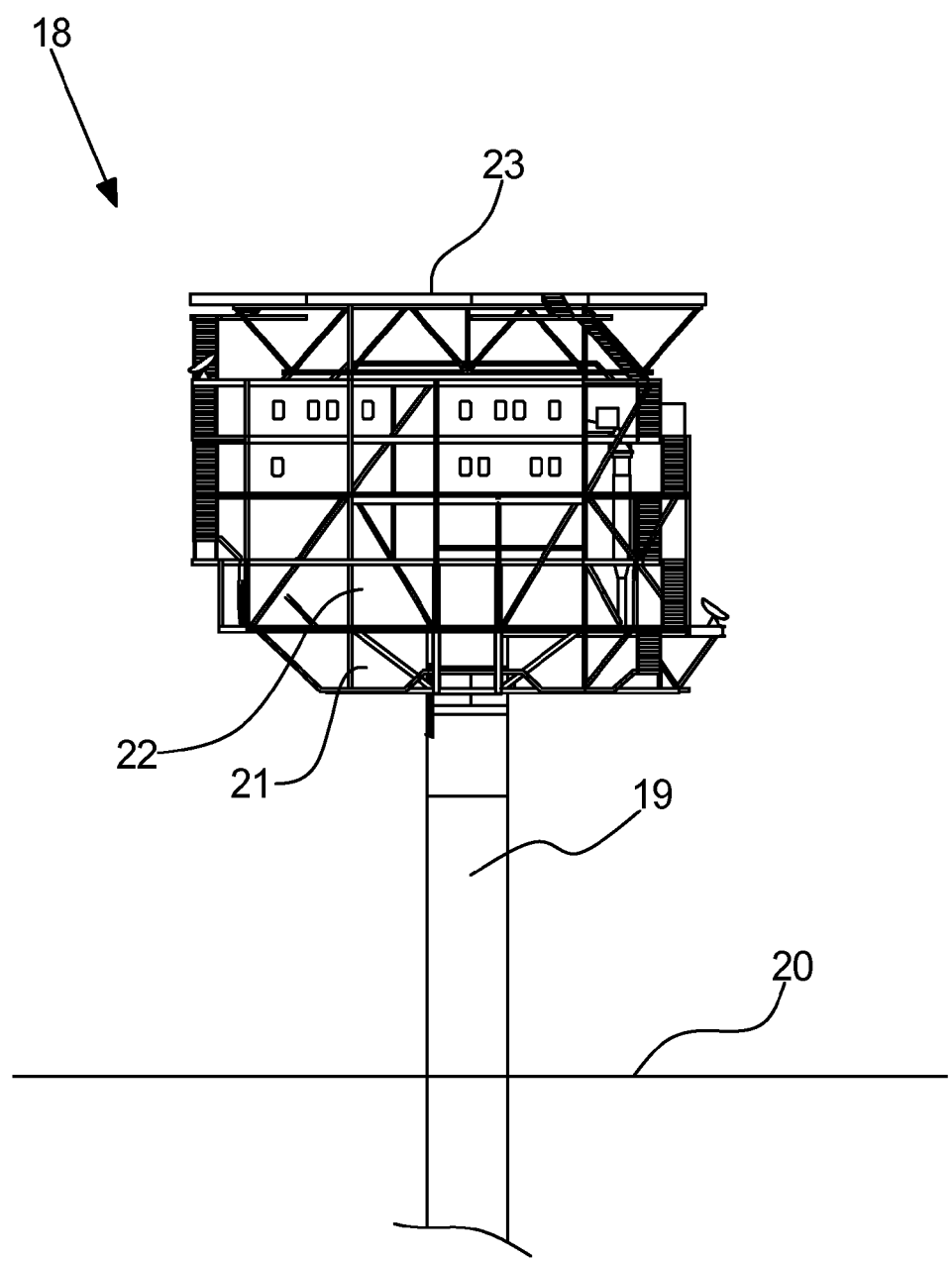

where $C_{en,1}$ and $C_{en,2}$ are the enzyme concentration of the first and second injection streams; and an underground water stream in fluid connection with the injection well and production well, the stream including water injected by the carrier system and enzyme solution injected by the enzyme system.

19 Claims, 4 Drawing Sheets

(56) References Cited

U.S. PATENT DOCUMENTS

| | | | | |
|---|---|---|---|---|
| 4,466,892 | A | * | 8/1984 | Chan et al. ............. 507/207 |
| 4,501,674 | A | | 2/1985 | Wu |
| 4,610,302 | A | | 9/1986 | Clark |
| 5,513,705 | A | | 5/1996 | Djabbarah et al. |
| 6,138,760 | A | * | 10/2000 | Lopez et al. ............. 166/300 |
| 2006/0254769 | A1 | * | 11/2006 | Wang et al. ............. 166/266 |
| 2008/0115945 | A1 | * | 5/2008 | Lau et al. ............. 166/400 |
| 2008/0196892 | A1 | * | 8/2008 | Lau et al. ............. 166/268 |
| 2008/0283242 | A1 | | 11/2008 | Ekstrand et al. |
| 2009/0050325 | A1 | | 2/2009 | Gray et al. |
| 2009/0090504 | A1 | | 4/2009 | Weightman et al. |
| 2009/0288843 | A1 | | 11/2009 | Gray |
| 2010/0243248 | A1 | | 9/2010 | Golomb et al. |

OTHER PUBLICATIONS

Greenzyme; p. 1; Product Information from website—http://greenzyme.btprocessing.com/whatisgreenzyme.html; Jun. 2015.*
Masters et al.; Introduction to Environmental Engineering and Science; 2007; Chapter 1; pp. 1-46.*
International Search Report Application No. PCT/DK2012/050158 Completed: Apr. 18, 2013; Mailing Date: May 2, 2013 5 pages.

* cited by examiner

ENZYME ENHANCED OIL RECOVERY

FIELD OF THE INVENTION

The invention relates to enhanced oil recovery according to the claims.

BACKGROUND OF THE INVENTION

The invention relates to enhanced oil recovery (EOR). In practical terms, EOR relates to different techniques applied for the purpose of recovering as much oil from the underground as possible. A problem related to oil recovery in general is that a significant part of the oil remains in the underground when applying conventional recovery methods. Such methods may include water and gas flooding to keep the pressure high in the reservoir. In order to increase the amount of oil recovered from the underground, different techniques have been developed to increase the amount of oil recovered from already addressed reservoirs.

The conventionally applied techniques vary significantly in complexity, depending on many different factors including e.g. type of oil, the structure and the type of the underground formation, logistics, climate, amount of oil accessible from the well, etc.

The present invention relates to a specific type of oil recovery, namely the type of recovery in which the recovery is aided by the application of enzymes.

U.S. patent application U.S. 2008/0115945 A1 describes a method for recovery of hydrocarbons in a subterranean formation by a dedicated application of enzymatic fluid. The fluid is injected into the formation by adding it directly to the pump. This is followed by a soaking period in the reservoir, and then by injecting either water or steam into the formation, again followed by a soaking period. Finally, recovery of deposits follows. Optionally, the enzymatic fluid is heated to at least 80° C. prior to injection.

A problem related to the above mentioned prior art is that such EOR method may become relatively expensive in different ways. A particular problem in relation to the above-mentioned techniques is that enzymes are relatively expensive and that the increased recovery obtained may be relatively low, when compared to the cost related to the applied enzymes and the applied recovery method.

SUMMARY OF THE INVENTION

The invention relates to a method of establishing an enhanced oil recovery in an underground reservoir by means of a recovery system, the recovery system comprising at least one injection and production well,
the injection well comprising an injection pump system,
the injection pump system establishing an injection stream comprising a first injection stream and a second injection stream,
wherein said injection stream comprises enzyme added at the injection well,
the injection pump system establishing an injection stream through the injection well,
the injection pump system being coupled with a power supply system,
the production well comprising at least one fluid output,
the injection well and the production well actively establishing an underground water stream, the underground water stream being established in response to pressure established by the injection pump system,
the underground water stream comprising water and enzyme injected by the injection pump system,
where $C_{en,3}$ is the enzyme concentration of said injection stream, $$C_{en,3} = \left( \frac{C_{en,1} \cdot S_1 + C_{en,2} \cdot S_2}{S_1 + S_2} \right)$$

where $C_{en,1}$ and $C_{en,2}$ are the enzyme concentration of the first and second injection stream respectively, $S_1$ and $S_2$ are flow rates of the first and second injection streams respectively.

According to an embodiment of the invention, a high volume continuous injection stream combined with a relatively low concentration of enzymes, facilitates an advantageous oil recovery due to the fact that enzymes are transported in the reservoir at a relatively high throughput between the injection and the production wells, and that the high amount of water provides a relatively homogenous distribution of enzymes while being transported in the underground reservoir between the injection well(s) and the production well(s).

By application of a low concentration enzyme stream combined with a high flow rate, an advantageous utilization of enzyme activity is obtained.

Note that a high flow rate in this connection, i.e. of the underground water stream, may as a rule of thumb correspond to a flow velocity of e.g. 1 ft/day. Typical flow velocities may be in the order of 0.1 ft/day to 10 ft/day depending on the reservoir. Such a flow rate may in this context be regarded as relatively high when compared to a flow rate not driven by active pumping.

Thus, the application of a significant injection flow facilitates a relatively low enzyme concentration and an efficient and cost-effective recovery, where the applied enzymes are effectively distributed in suitable concentration. Such suitable concentrations may be calculated or estimated on the basis of the underground formation, its composition, the type of enzymes, the composition of the oil, and/or other relevant factors.

By injecting water and enzymes at a sufficiently high rate, the known concentration of enzymes at the surface will also be present in the underground reservoir. Therefore the enzyme concentration needs only to be high enough to give the wanted effect, i.e. it is not necessary to use larger concentrations of enzymes to compensate for the dilution of the enzymes in the underground. This high enough enzyme concentration may be calculated or estimated on the basis of the underground formation, its composition, the type of enzymes, the composition of the oil, and/or other relevant factors.

An oil well is a general term for any drilling through the earth's surface that is designed to find and acquire petroleum oil hydrocarbons. Usually some natural gas is produced along with the oil. A well that is designed to produce mainly or only gas may be termed a gas well.

The injection pumps system may advantageously establish a mixed final injection stream exterior to the reservoir, i.e. typically right before injection into the well. The mixing may thus preferably be established onshore or offshore.

In an alternative embodiment, the injection pump system may establish a mixed final injection stream in the injection well or in the reservoir. The final injection stream may then comprise several injection streams injected separately and only mixed in the injection well or in the reservoir. This separate injection may be in separate tubes in same well or in different nearby wells.

The mixing of the at least two injection streams into a final injection stream, which is injected into the underground reservoir, may e.g. be performed by means of a reactor or a reactor system. A reactor is understood as a vessel that facilitates mixing of fluids, possibly with compounds or other materials or substances mixed into the fluids. The reactor may or may not facilitate chemical reactions, i.e. it may be a reactor facilitating mixing, or it may be a reactor facilitating both mixing and chemical reactions.

Generally, the injection fluids referred to in the application are preferably liquids. I.e. enzymes suspended or dissolved in water, oil or another liquid.

In general the term injection stream refers to at stream that will be injected into the underground reservoir, or to a stream which will be mixed into a final injection stream, which will be injected into the underground reservoir.

According to an example embodiment of the invention, the final injection stream may comprise several injection streams, such as a first injection stream, a second injection stream, etc. The enzyme concentration of the final injection stream should then be calculated from the enzyme concentrations and flow rates of the individual injection streams. In the case of N injection streams, the enzyme concentration of the final injection stream is given by $$C_{en,inj} = \frac{\sum_{i=1}^{N} C_i \cdot S_i}{\sum_{i=1}^{N} S_i}$$

where $C_{en,inj}$ is the concentration of the final injection stream and $C_i$ and $S_i$ are the enzyme concentration and flow rate of the individual injection streams, respectively. In an example embodiment the final injection stream may comprise e.g. four different injection streams. The enzyme concentration of the final injection stream may then according to the above equation be calculated from $$C_{en,inj} = \frac{C_1 \cdot S_1 + C_2 \cdot S_2 + C_3 \cdot S_3 + C_4 \cdot S_4}{S_1 + S_2 + S_3 + S_4}$$

Note that the formulas are conceptual and only to illustrate a framework relevant to the provisions of the invention. The real conditions in the reservoir are much more complex.

According to an advantageous embodiment of the invention, the injection pump system comprises two pump systems; a carrier fluid pump system and an enzyme pump system, the carrier fluid pump system establishing a first injection stream, the enzyme pump system establishing a second injection stream, and the underground water stream comprises water injected by carrier fluid pump system and enzyme injected by the enzyme pump system, Preferably, the first and second injection stream should be mixed into a final injection stream prior to injection, i.e. typically above see level or e.g. on the ground surface.

However, in some embodiments this mixing of the first and second injection stream into a final injection stream may be performed in the injection well or in the underground reservoir.

A further advantage related to the invention, may be obtained due to the fact that the underground water stream in the reservoir is relatively well defined. Consequently, it may be possible to recover and reuse enzymes injected into the injection well. The enzymes may be separated from the output established at the production well.

According to an advantageous embodiment of the invention, the first injection stream is a fluid carrier stream.

According to an advantageous embodiment of the invention, the second injection stream comprises enzyme.

According to an advantageous embodiment of the invention, the first and second injection streams are continuously mixed and injected into the underground reservoir and where the enzyme concentration in the mixed first and second injection streams is less than 0.5% by weight. The mixing may in this embodiment preferably be performed exterior to the injection well. However, in alternative embodiments, the mixing may be performed in the injection well or in the reservoir.

The enzyme concentration ($C_{en,3}$) in the mixed injection stream may advantageously be set to a minimum of about 50 ppm.

The referred enzyme concentration of at least 50 ppm may, when using an appropriate enzyme, enhance the recovery. Using a minimum level enzyme is a specific measure addressing the specific provision of the present invention.

The provision referred to here is that the enzyme must be transported from one location, i.e. the injection well, to another location, i.e. the production well, which is relatively distant to the other. The provision, i.e. moving carrier water over a larger distance, is related to certain costs, such as powering the pump system. In several applications the injection of enzymes into the reservoir and transporting them towards the production well will reduce the costs relating to the transport itself. This may result in an increase of oil recovery, which again may shorten the period in which the carrier water is required. In other words, the recovery may be performed over a shorter time and therefore with less transport of carrier water.

An advantage of the invention may be that the relative permeability of the underground formation to the oil is increased. This results in an increased mobility of oil in the reservoir. This increased permeability or mobility may result in an increased flow rate of oil in the reservoir, which again may result in an increased recovery rate of oil. Also, an increased relative permeability of the underground reservoir to the oil may result in an increased amount of oil recovered. Also, it may result in an increased amount of oil recovered relative to the injection rate of injection fluid.

An advantage of the invention may be that the recovery of oil using enzymes is made faster than non-enzyme recovery methods. A faster recovery of oil may be very advantageous in returning the investments related to the build of plants for recovery faster.

Generally it is an advantage that the enzyme concentrations are maintained substantially constant over a period of time being e.g. a day, a week, a month, or a year, where the preferred time period is a month. Hence, if the enzyme concentrations in the injection stream intentionally or unintentionally would rise or fall, the average intended enzyme concentration should be maintained.

The concentration may be established and measured e.g. on a runtime basis.

A further advantageous embodiment of the invention may be obtained if the enzyme concentration of the injected water is at least 100 ppm.

A further advantageous embodiment of the invention may be obtained if the enzyme concentration of the injected water is at least 200 ppm.

A further advantageous embodiment of the invention may be obtained if the enzyme concentration of the injected water is at least 500 ppm.

A further advantageous embodiment of the invention may be obtained if the enzyme concentration of the injected water is less than 5000 ppm.

A further advantageous embodiment of the invention may be obtained if the enzyme concentration of the injected water is less than 1000 ppm.

A further advantageous embodiment of the invention may be obtained if the enzyme concentration of the injected water is less than 500 ppm.

A further advantageous embodiment of the invention may be obtained if the enzyme concentration of the injected water is less than 200 ppm.

A further advantageous embodiment of the invention may be obtained if the enzyme concentration of the injected water is less than 100 ppm.

A further advantageous embodiment of the invention may be obtained if the enzyme concentration of the injected water is between 0.005% and 0.5% by weight.

A further advantageous embodiment of the invention may be obtained if the enzyme concentration of the injected water is between 0.005% and 0.1% by weight.

A further advantageous embodiment of the invention may be obtained if the enzyme concentration of the injected water is between 0.005% and 0.05% by weight.

A further advantageous embodiment of the invention may be obtained if the enzyme concentration of the injected water is between 0.005% and 0.02% by weight.

A further advantageous embodiment of the invention may be obtained if the enzyme concentration of the injected water is between 0.005% and 0.01% by weight.

A further advantageous embodiment of the invention may be obtained if the enzyme concentration of the injected water is between 0.01% and 0.5% by weight.

A further advantageous embodiment of the invention may be obtained if the enzyme concentration of the injected water is between 0.02% and 0.5% by weight.

A further advantageous embodiment of the invention may be obtained if the enzyme concentration of the injected water is between 0.05% and 0.5% by weight.

A further advantageous embodiment of the invention may be obtained if the enzyme concentration of the injected water is between 0.1% and 0.5% by weight.

A further advantageous embodiment of the invention may be obtained if the enzyme concentration of the injected water is 0.01-0.5% by weight when calculated per day.

A further advantageous embodiment of the invention may be obtained if the enzyme concentration of the injected water is 0.01-0.5% by weight when calculated per week.

A further advantageous embodiment of the invention may be obtained if the enzyme concentration ($C_{en,3}$) of the injected water is 0.01-0.5% by weight when calculated per month.

A further advantageous embodiment of the invention may be obtained if the enzyme concentration ($C_{en,3}$) of the injected water is 0.01-0.5% by weight when calculated per year.

According to an advantageous embodiment of the invention, the first and second injection streams are continuously mixed and injected into the underground reservoir and where the enzyme concentration in the mixed first and second injection streams being less than 0.5% by weight per month.

The referred enzyme concentration ($C_{en,3}$) of less than 0.5% by weight calculated over a longer period, such as a month, may, when using an appropriate enzyme, enhance the recovery. In particular it is noted that the continuous underground transport of enzymes is availed insofar the amount of enzyme injected is kept relatively constant.

According to an advantageous embodiment of the invention, the first and second injection streams are continuously mixed and injected into the underground reservoir and where the enzyme concentration in the mixed first and second injection streams being less than 0.7% by weight per month Thus, e.g. at least 50 ppm per month in the mixed first and second injection streams refers to an average concentration of enzyme in the mixed streams of at least 50 ppm when calculated over an injection period of a month. In other words, ppm per a time period, refers to an average concentration referring to the total water and enzyme flow over the given time period.

According to an advantageous embodiment of the invention, the enzyme concentration in the mixed first and second injection stream is reduced gradually over a period of at least one year. This may e.g. be done if the pressure in the reservoir decreases to a level below a given value, if enzymes already injected are available in the reservoir in sufficient quantities, or done to reduce the expenses related to the acquisition of enzymes.

The enzyme concentration ($C_{en,3}$) may optionally be gradually reduced over time when the oil saturation is reduced and the carrier water gradually may carry the oil by itself, when using an appropriate enzyme to enhance the recovery. In particular it is noted that the continuous underground transport of enzyme is availed insofar the amount of enzyme injected is kept relatively constant.

According to an advantageous embodiment of the invention, the mixing of liquid enzyme and injection fluid is performed prior to injection.

According to an alternative embodiment of the invention, the mixing of liquid enzyme and injection fluid is performed after injection.

A problem related to a typical high concentration injection ($C_{en,3}$) is that such injection may be relatively inefficient, partly because the concentration of enzymes is too low to obtain a cost-effective result in certain parts of the reservoir, whereas the concentration of enzymes in other parts of the reservoir is too high in the sense that the benefits of the enzyme is reached more or less fully at lower concentrations. In other words, a continuous high volume pre-mixed stream of water having a low-concentration enzyme will result in an advantageous utilisation of the enzymes.

According to an advantageous embodiment of the invention, the method is applied on-shore.

According to an even more advantageous embodiment of the invention, the method is applied off-shore.

A particular advantageous embodiment of the invention is where the mixing of the enzyme is performed when applying a premix of enzymes which is again mixed off-shore to a water carrier stream. This variant of the method will effectively reduce the requirements to logistics in the sense that the transport of the enzymes to the off-shore site may be performed e.g. by ships instead of more expensive alternatives, e.g. production on-site or use of pipe-lines dedicated for the purpose of enzyme transport.

According to an advantageous embodiment of the invention, the recovery system comprises a plurality of injection wells and a plurality of production wells.

When applying a plurality of wells, it may be possible to establish an effective recovery in very large oil reservoirs.

Moreover, the invention generally relates to a method of establishing an enhanced oil recovery, whereby enzyme is transported from one well to another.

When enzymes are transported actively through the underground a great advantage is achieved. Such an advantage of this transport may be that the oil recovery can benefit from the fact that enzymes are reusable in contrast to typical chemical compounds. In other words, a mobility of the enzyme is provided according to the provisions of the invention, which again invokes that the enzymes ideally may retain enzymatic activity over the complete extent of the transport way from injection to production well, or at least until the point where the enzyme for some reason may loose its activity.

According to an advantageous embodiment of the invention, the transport is established at least partly by means of at least one injection pump.

According to an advantageous embodiment of the invention, the enzyme is transported from an injection well to a production well.

According to an advantageous embodiment of the invention, the enzyme is transported from one well to another by means of a continuous water stream.

The enzyme-carrying water stream should preferably be transported from the injection well to the production well in one single stage in the sense that injection and production may be performed at the same time.

According to an advantageous embodiment of the invention, the injection well and production well are physically separated, horizontally and/or laterally.

According to a preferred embodiment the invention, it is important that the injection and production should be performed at the same time during a significant duration of time in order to make the recovery economically attractive. The duration of time may e.g. be at least a week or several weeks. An important measure for availing such a procedure and making it commercially attractive is by separating the input and the output as seen from the underground. This separation necessitates that injection water will have to travel through a larger part of the underground, This feature, again, makes it possible to drive the water injection and oil production simultaneously without "short" circuiting the well, i.e. transporting the injection enzyme directly from the injection well to a production well in the vicinity, thereby counteracting the distribution of the enzymes in the well.

According to an advantageous embodiment of the invention, the injection well and the production well are located into the same reservoir, wherein the output of the injection well into the underground is distant to the output from the oil reservoir into the production well. In other words, the underground water stream may be established laterally, horizontally, vertically or a combination thereof.

According to an advantageous embodiment of the invention, the injection well and the production well are located at the same or different plant locations, wherein the output of the injection well into the underground is distant to the output from the oil reservoir to the production well.

A distance between the injection well and the production well may be needed in order for the injected water and enzymes to have effect of a part of the reservoir. However, the minimum distance may be rather low. According to an advantageous embodiment of the invention, the distance between the injection well and the production well is at least 50 feet.

Note that in the underground, the injection well and production well may be vertical, horizontal, or in-between, i.e. at least partly horizontally or at least partly vertically. Therefore the distance between the wellbore of the injection well and the wellbore of the production well may likewise be vertical, horizontal, or in-between. Therefore, in some embodiments of the invention, the distances between the injection well and production well may refer to horizontal distances in the underground between the wellbore of the injection well and the wellbore of the production well, or to at least partly vertical distances in the underground between the wellbore of the injection well and wellbore of the production well. Moreover, note that the horizontal distance may also apply if the injection and production wells extend at least partly horizontally in the underground.

According to an advantageous embodiment of the invention, the distance between the injection well and the production well is at least 150 feet.

A further advantageous embodiment of the invention may be obtained if the distance between the injection well and the production well is at least 300 feet.

A further advantageous embodiment of the invention may be obtained if the distance between the injection well and the production well is in the range of 600 feet to 2500 feet.

According to an embodiment of the invention, the distance between the injection well and the production well is in the range of 300 feet to 3500 feet.

When the described high volume stream is injected, it may advantageously be possible to apply a relatively low concentration of enzymes, thereby optimizing the cost efficiency.

According to an advantageous embodiment of the invention the injection rate is at least 60000 barrels per month.

According to an advantageous embodiment of the invention the injection rate is at least 100000 barrels per month.

According to an advantageous embodiment of the invention the injection rate is at least 120000 barrels per month.

According to a further advantageous embodiment of the invention, the injection rate is less than 150000 barrels per month.

In this application a barrel is used in the sense that is customary within the oil industry, i.e. one barrel corresponds to 42 US gallons or 159 liters.

According to an embodiment of the invention, the injection rate of the first injection stream is substantially constant throughout most of a month. According to this embodiment the uptime, i.e. the time where the injection occurs, is relatively high, e.g. 99% during a month.

According to an embodiment of the invention, the injection of enzymes may be halted for a period in the order of weeks or months. This may e.g. be in the case of maintenance of enzyme handling equipment, or to cut expenses connected to the acquisition of enzymes.

According to an advantageous embodiment of the invention, the injection pump system comprises at least one turbine driven pump. The specific pump type of turbine driven pumps is preferred in order to achieve the high throughput.

According to an advantageous embodiment of the invention, said enzymes are oil viscosity lowering enzymes.

According to an advantageous embodiment of the invention, said enzymes are oil surface tension reducing enzymes.

According to an advantageous embodiment of the invention, said enzymes are carbon-carbon bond scissoring enzymes.

According to an advantageous embodiment of the invention, said enzymes are oil-wet altering enzymes.

According to an advantageous embodiment of the invention, said enzymes are emulsifying enzymes.

The enzymes may belong to one or more of the above mentioned enzyme groups. Also, the enzymes may as well belong to other enzyme groups relevant for enhanced oil recovery.

According to an advantageous embodiment of the invention, the injection rate is per injection well. When several injection wells are injecting water and enzyme into the same reservoir, the total injection rate of water and enzyme into the reservoir is the sum of the individual injection rates of the individual injection wells.

THE FIGURES

The invention will now be described with reference to the drawings, where

Figure 2:
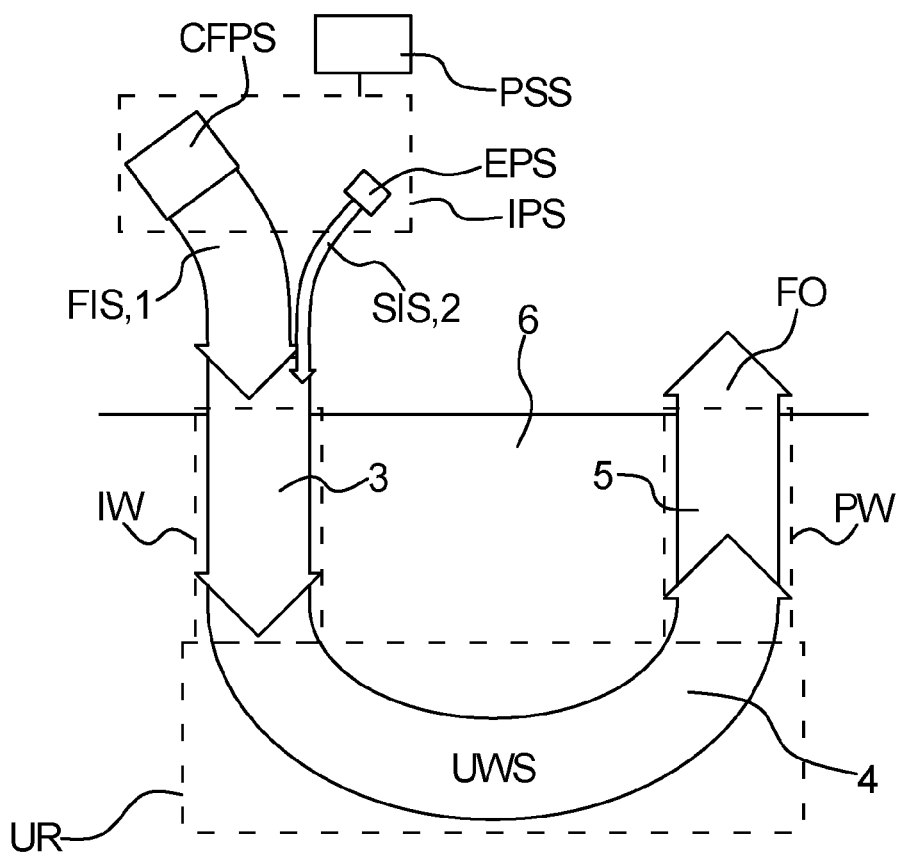
Figure 3:
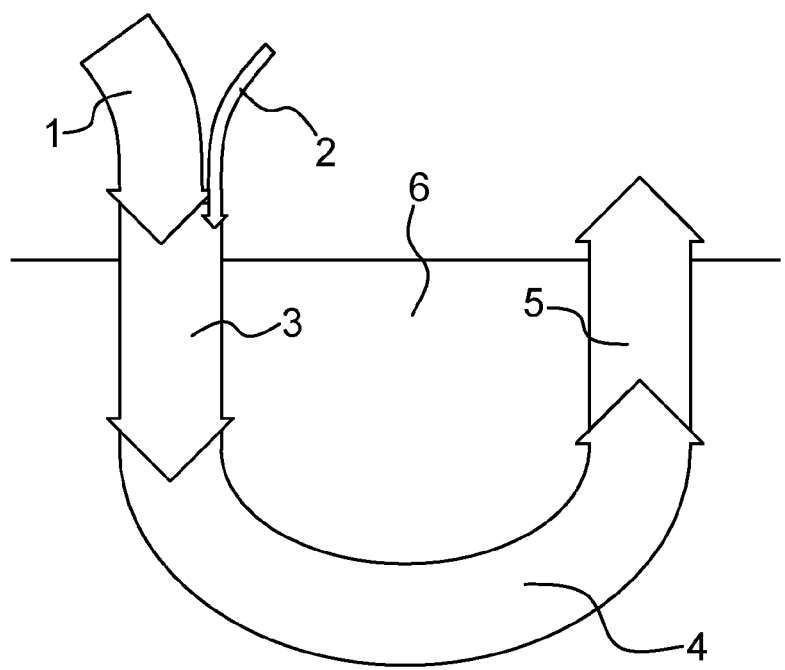
Figure 4:
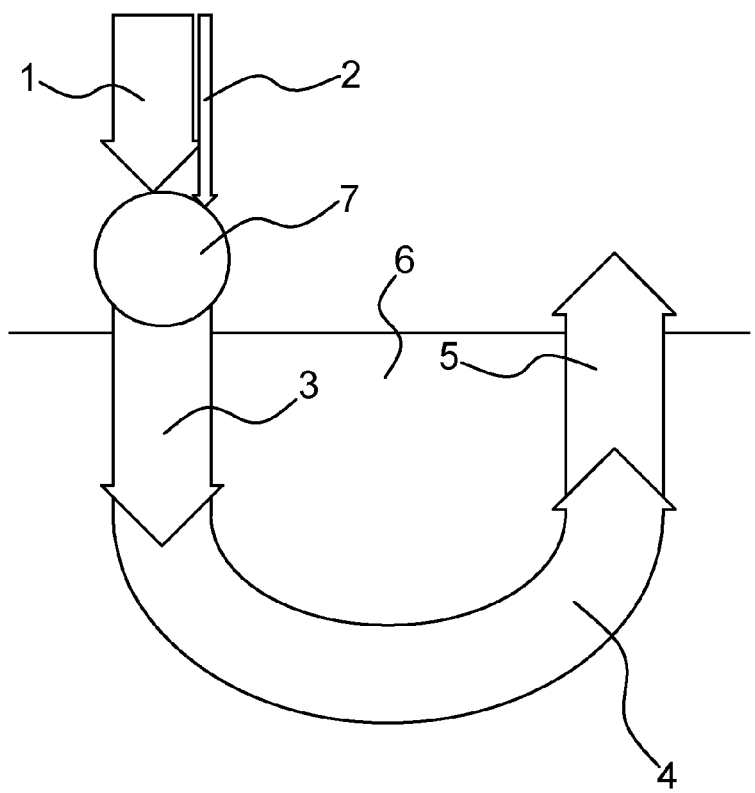
Figure 5:
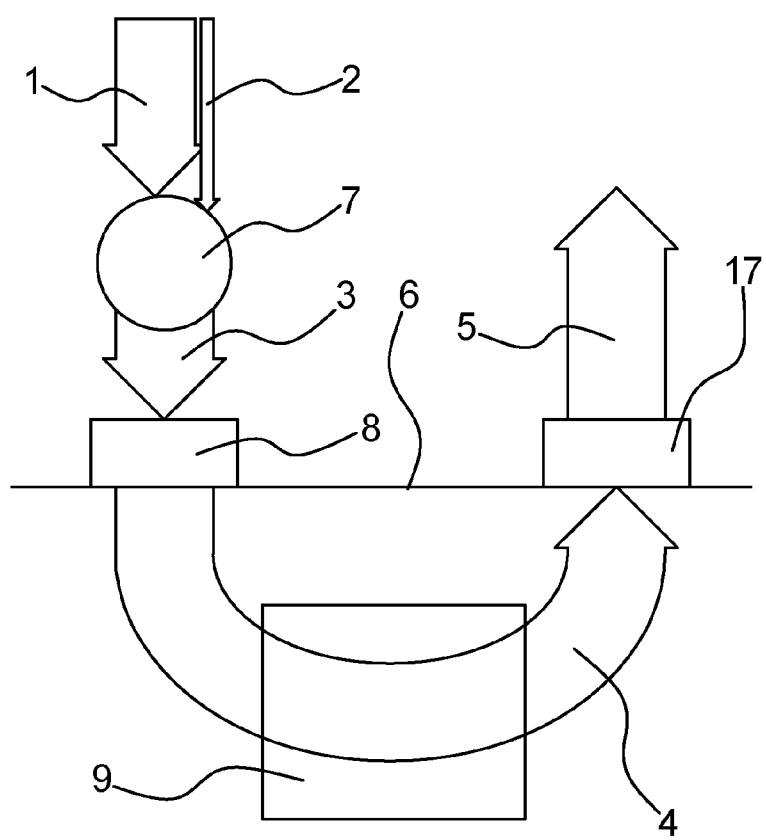
Figure 6:
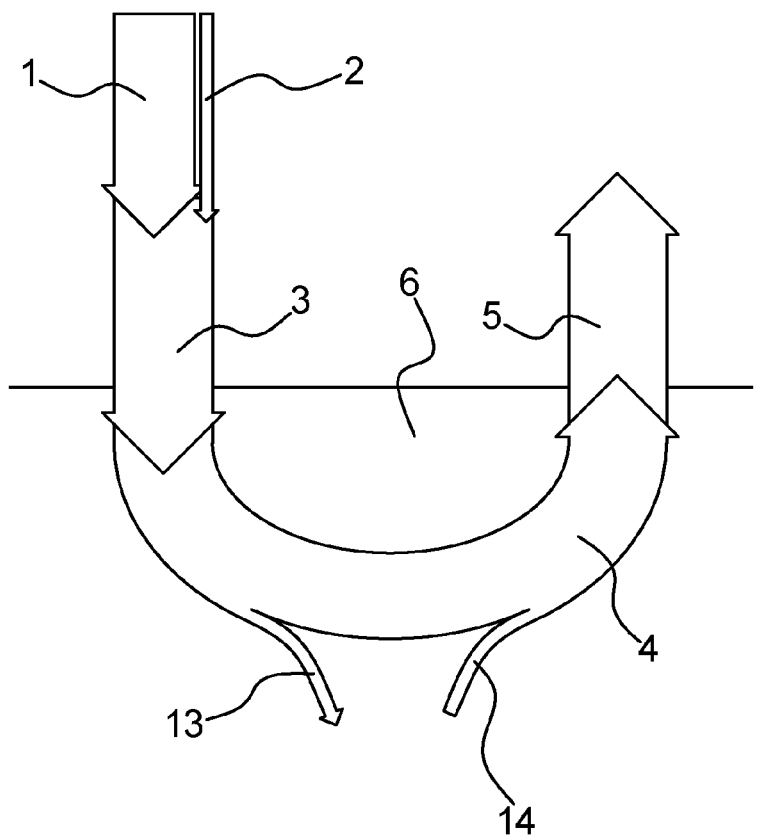
Figure 7:
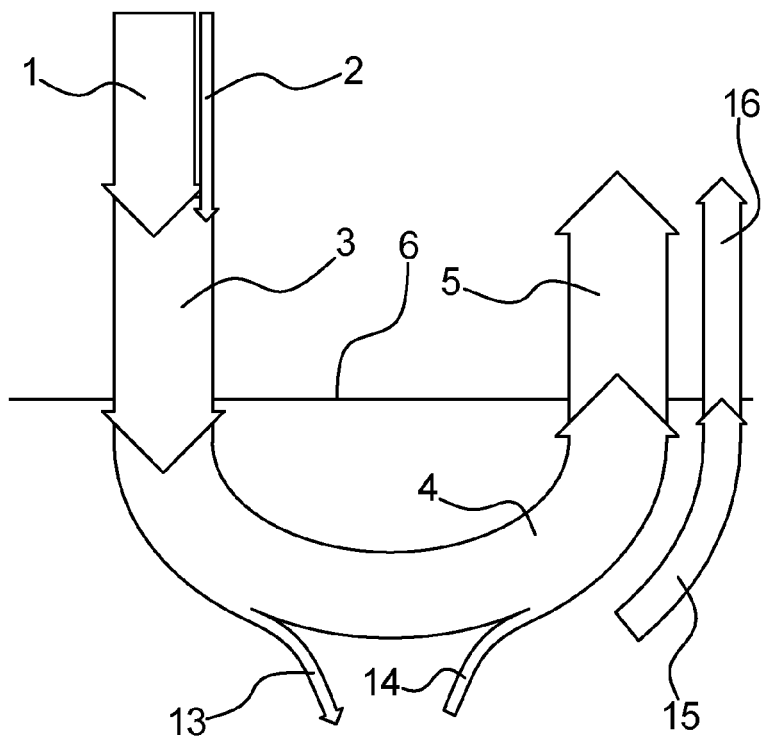

FIG. 1 shows a schematic view of an off-shore oil platform,

FIG. 2 shows a schematic view of a method of recovering oil using an enzyme and creating an underground water stream, FIG. 3 shows a schematic view of a method of recovering oil using an enzyme containing water-based injection fluid, FIG. 4 shows a method according to an embodiment, where a mixing unit is shown, FIG. 5 shows a method according to an embodiment in more detail, FIG. 6 shows a method according to an embodiment, where an interaction with the underground reservoir is included, FIG. 7 shows a method according to an embodiment, where the interaction with the underground reservoir and the recovered oil as a separate portion are included.

DETAILED DESCRIPTION

Referring to FIG. 1, an off-shore oil platform 18 is illustrated. As is illustrated on the figure, the platform 18 is placed on a platform leg 19, extending vertically from the platform and through the surface of the sea 20. The platform comprises a service deck 21, a utility deck 22, and deck for housing of personnel. Furthermore, the platform comprises a helipad 23 providing landing possibility for helicopters. The platform may be used to operate one or more injection wells or one or more production wells, operating according to the provisions of the invention.

Referring to FIG. 2, a method for establishing an enhanced oil recovery in an underground reservoir (UR) is illustrated. The recovery is obtained by means of a recovery system which comprises at least one injection and production well (IW, PW). The injection well (IW) comprises an injection pump system (IPS). The injection pump system is an overall designation of the complete pump system. The pump system may comprise one or more subsystems, which in this context may be a carrier fluid pump system (CFPS) for establishing a first injection stream (FIS) and an enzyme pump system (EPS) for establishing a second injection stream (SIS). The injection pump system (IPS) is coupled to a power supply system (PSS) which supplies the power needed to drive the carrier fluid pump system (CFPS) and the enzyme pump system (EPS). The first and second streams (FIS, SIS) are injected into the underground reservoir (UR) where they form an underground water stream (UWS) going to the production well (PW), where a fluid output (FO) is recovered. The fluid output may comprise e.g. a combination of water and hydrocarbons. Relevant measures well-known within the art are applied for separating the relevant components of the fluid output, e.g. water and oil.

The underground water stream (UWS) is established by the pressure applied to the injection stream by the injection pump system (IPS), which again receives power from a power supply system (PSS). The enzyme concentration $C_{en,3}$ of the injection stream is $$C_{en,3} = \left( \frac{C_{en,1} \cdot S_1 + C_{en,2} \cdot S_2}{S_1 + S_2} \right)$$

where $C_{en,1}$ and $C_{en,2}$ are the enzyme concentration of the first and second injection stream respectively, and $S_1$ and $S_2$ are flow rates of the first and second injection stream respectively.

In one embodiment, the first injection stream (FIS) serves a carrier fluid and the second may comprise the relevant enzyme. The enzyme may e.g. be mixed into the second injection stream prior to the mixing of the first and second injection stream. Preferably, this mixing should be performed on the site.

According to a preferred embodiment as illustrated above, the enzyme is transported from one well to another. In other words, the enzymes are advantageously transported actively through the underground. A great advantage of this transport is that the oil recovery may benefit from the fact that enzymes are reusable in contrast to typical chemical compounds. In other words, the present invention establishes a high mobility of the enzymes, which again invokes that the enzymes ideally may retain their enzymatic activity over the complete extent of the transport route, or at least until the point where the enzyme for some reason may loose its activity.

The illustrated enzyme is transported from one well IW to another PW by means of a continuous water stream. The enzyme-carrying water stream should preferably be transported from the injection well to the production well in one single stage in the sense that injection and production may be performed at the same time.

According to an embodiment of the invention, it is important that the recovery is performed in one step during a significant duration of time, in order to make the recovery economically attractive. An important measure for availing such a one-step procedure and making it commercially attractive is by separating the input and the output as seen from the underground. This may e.g. be obtained by separating the injection well and the production well e.g. by several hundred meters. This separation necessitates that injection water will have to travel through a larger part of the underground. This feature, again, makes it possible to drive the oil recovery injection and production simultaneously without "short" circuiting the well, i.e. transporting the injection enzyme directly from the injection well to a production well in the vicinity, thereby counteracting the distribution of the enzyme in the well.

Evidently, this distance may be obtained both horizontal and lateral, thereby forcing the enzymes through a large extent of the reservoir.

It should generally be noted that the illustrated process flows in no way represent sharp distinguishably process flows. Evidently, the illustrated and described flows throughout the application refer to principle representation of physically rather diffuse and non-distinct flows.

Referring to FIG. 3, a method for operating an underground reservoir is illustrated. The method comprises the following steps, providing a first continuous injection stream 1 being water based, and providing a second continuous injection stream 2 being a liquid mixture of enzymes and water. The method furthermore involves continuously mixing the first injection stream 1 with the second injection stream 2, into becoming the final injection stream 3, and injecting the final injection stream 3 through the surface of the ground 6 and into an underground reservoir. After the final injection stream 3 has been injected it establishes an underground water stream 4. The underground water stream 4 will move through the underground reservoir until it is recovered at a production as illustrated by a recovered stream 5.

In this embodiment, the final injection stream 3 essentially consists of the first injection stream 1 and the second injection stream 2, the enzyme concentration of the final injection stream 3. In this specific application, where only two injection streams are mixed into the final injection stream, the enzyme concentration of the final injection stream may be expressed by $$C_{en,3} = \left( \frac{C_{en,1} \cdot S_1 + C_{en,2} \cdot S_2}{S_1 + S_2} = \frac{C_{en,1} \cdot \frac{S_1}{S_2} + C_{en,2}}{\frac{S_1}{S_2} + 1} \right) = \frac{C_{en,1} \cdot R + C_{en,2}}{R + 1}$$

where $C_{en,3}$ is the enzyme concentration of the final injection stream 3, $C_{en,1}$ and $C_{en,2}$ are the enzyme concentration of the first and second injection stream respectively, $S_1$ and $S_2$ are flow rates of the first and second injection stream respectively, and R is the ratio between the injection rate of the first and second injection stream. Flow rates $S_1$ and $S_2$ may come from flow measurements of the first and second injection streams respectively, or be derived from dimensions of pipelines or other equipment, or in any other way be values or indicators essentially representing the flow rate.

It should be noted that further injection streams may be added and mixed into the final injection stream when appropriate.

It is noted that the already mentioned underground water stream in this and other embodiments of the invention may be established by means of one or more injection streams and one or more recovery streams. Hence, the establishment of a given concentration of enzymes in a given underground water stream may be established with input of enzyme from several injection streams established at one or several injections wells.

Moreover, the recovery may be established by means of several recovery streams established at one or several different production wells.

The enzyme concentration of an underground water stream may therefore, according to an embodiment of the invention, be established on the basis of the enzyme concentration of the injections stream(s).

In an embodiment of the invention, the enzyme concentration of the first continuous injection stream is essentially zero ($C_{en,1} \approx 0$) and the flow rate of the first injection stream is much larger than the flow rate of the second injection stream ($S_1 \gg S_2$). In this embodiment of the invention the above equation for the enzyme concentration of the injection stream 3 is reduced to $$C_{en,3} \approx \frac{C_{en,2}}{R}$$

However, in an alternative embodiment, the enzyme concentration of the first injection stream 1 may be non-negligible, while the flow rate of the first injection stream 1 is still much larger than the flow rate of the second injection stream ($S_1 \gg S_2$). The above approximation changes to $$C_{en,3} = \frac{C_{en,1} \cdot R + C_{en,2}}{R}$$

In an embodiment of the invention, the enzyme concentration of the final injection stream 3 may not be a constant concentration but vary in time. The effective concentration $C_{en,3}^{eff}$ can then be derived as a time-average of the concentration. If the concentration varies in time, the effective concentration is given by $$C_{en,3}^{eff} = \frac{\int_{t_0}^{t_0+T} C_{en,3}(t) dt}{T}$$

where $t_0$ is the time at which the averaging starts and T is the temporal length over which the concentration is averaged. The temporal length of T could e.g. be in the range of days, weeks or months.

The time-averaged or effective concentration $C_{en,3}^{eff}$ may appear by varying the flow rate of the second injection stream 2, e.g. by turning the second injection stream 2 on and off. The effective concentration $C_{en,2}^{eff}$ of the second injection stream can in the on/off situation be expressed as $$C_{en,2}^{eff} = C_{en,2} \cdot F$$

where F is the fraction of time in which the second injection stream 2 is turned on.

In one embodiment of the invention, the final injection stream 3 has a concentration of enzymes of at least 50 ppm in average, so that the concentration of enzymes in the final injection stream 3 when averaged over a period of at least one month is at least 50 ppm.

In an example embodiment, a concentration of e.g. 80 ppm may be realized by using a water-based first continuous injection stream 1 with an enzyme concentration of essentially zero, a second continuous stream 2 with an enzyme concentration of 5%, and a ratio of 624 between the flow rate of the first and second continuous injection stream 1 and 2.

In FIG. 4 an embodiment of the invention is illustrated. The mixing of a first injection stream 1 with a second injection stream 2 is shown with a mixing unit 7 with the first and second injection stream 1 and 2 on one side and a final injection stream 3 on the other side of the mixing unit 7. The mixing unit 7 may comprise one or more reactors.

In FIG. 5 another embodiment of the invention is illustrated. Here the injection of the final injection stream 3 into the ground 6 is emphasized by showing injection unit 8. Furthermore, the underground reservoir 9 is shown with the underground water stream 4 passing through it. Finally, a recovery unit 17 is illustrated to show that the recovery of the recovered stream 5 from the underground reservoir 9 may be facilitated by a recovery unit. This may be in the form of a pump, e.g. an electrical submersible pump (ESP) in the production well.

In FIG. 6 yet another embodiment of the invention is illustrated. Further to the above embodiments, it is in this embodiment emphasized that parts of the injected water may be mixed with underground water. This interaction with the underground formation water is illustrated on FIG. 6. The term formation water refers to water or non-hydrocarbonic fluids existing in the underground reservoir or adjacent formations. A fluid stream 13 originating from the injection fluid is illustrated as being lost or redirected in the underground as a result of the underground mixing.

A further fluid stream 14 is illustrated. This fluid stream 14 is a contribution to the underground water stream 4 that comes from the surroundings, i.e. the contribution resulting from the underground mixing. Fluid streams 13 and 14 together indicate how the underground water stream 4 interacts with the formation water and how the underground water stream 4 at some particular point in the reservoir may be constituted by fluid from the final injection stream 3 as well as fluid added from the underground surroundings.

From the description of FIG. 3, the enzyme concentration of the final injection stream 3 is given by the ratio between the injection rate of the first and second injection streams 1 and 2 and the enzyme concentration of the second injection stream 2, when it is assumed that the enzyme concentration of the first injection stream 1 is substantially zero and when the injection rate of injection stream 1 is much higher than that of injection stream 2. This is illustrated by the equation $$C_{en,3} = \frac{C_{en,2}}{R}$$

In an embodiment of the invention, the purpose is to minimize the relative interaction with the formation water. By the relative interaction is meant the ratio between the water exchanged with the reservoir and the underground water stream 4. One effect of having a relatively weak interaction with the formation water is that the enzyme concentration in the underground water stream 4 will be substantially the same as the enzyme concentration of the final injection stream 3. This means that the enzyme concentration in the underground water stream 4 and hence in the underground reservoir will substantially be determined by the ratio between the first and second injection streams 1 and 2 and the enzyme concentration $C_{en,2}$ of the second injection stream 2 as illustrated by the above equation.

If a fluid contribution to the underground water stream 4 from the formation water by fluid stream 14 is taken into account, the enzyme concentration of the underground water stream 4 is changed according to $$C_{en,4} = \frac{C_{en,2}}{R \cdot \left(1 + \frac{S_{14}}{S_1}\right)}$$

where $S_{14}$ is a flow rate of the fluid stream 14 coming from the underground reservoir and $C_{en,4}$ is the concentration of enzymes in the underground water stream 4, i.e. in the reservoir. As long the flow rate of the first injection stream 1, which is water based, is much larger than the flow rate of the fluid stream 14 from the reservoir, the above equation is reduced to the simpler one where only the enzyme concentration of the second injection stream 2 and the ratio between the flow rates of injection streams 1 and 2 determine the enzyme concentration in the underground water stream 4.

According to a preferred embodiment of the invention, the injection flow at the surface may be kept high to ensure that the contribution to the specific underground water stream 4 is significant. According to further preferred embodiment of the invention, this contribution may moreover be negligible in a physical sense, if the fluid stream 14 has an enzyme concentration which is closer to the concentration of enzyme in the final injection stream 3. This may preferably be obtained by the application of several injection streams from several injection wells. In this way, a part of the stream 14 may be enzyme liquid originating from another injection well.

Likewise, further production wells may be established, e.g. to recover the part of the injected enzyme fluid 13 which is directed away from the underground water stream 4.

Referring to FIG. 7, a schematic view of the injection stage showing another embodiment of the invention is illustrated. On FIG. 7, however, the recovery of oil is indicated separately. This is done by subsurface hydrocarbon stream 1 and recovered hydrocarbon stream 16.

A short and simplified explanation regarding the underground stream in the reservoir will be given below.

When water or injection fluid is injected into a reservoir, the pressure will rise around the injection well. At the same time, recovering oil or fluids from the production well will decrease the pressure around the production well. This will create a pressure gradient from the injection well to the production well. The pressure gradient will cause fluid to flow from the high pressure region towards the low pressure region. This flow will cause the pressure gradient to decrease. When an equilibrium state is obtained the injection rate will match the recovery rate, and the pressure gradient will be substantially constant.

Movement of a liquid driven by a pressure difference or pressure gradient can in a simple picture be described by the equation $$a_x = -\frac{1}{\rho}\frac{dp}{dx}$$

where $\alpha_x$ is the acceleration component in one direction (here the x-direction) resulting from the pressure gradient, $\rho$ is the density of the liquid, and $dp/dx$ is the pressure gradient. It is important to emphasize that $\alpha_x$ is only the component of the acceleration resulting from the pressure gradient, and in the underground the situation is much more complex. This equation does not account for e.g. the underground friction. Therefore it cannot describe the actual movement of the water in the reservoir. However, because there is an increased pressure at the injection well due to the injected fluids, and a decreased pressure at the production well, a pressure gradient will be present. The acceleration component equals the force per mass. Therefore, the above equation illustrates how the pressure gradient results in a force on the water in the reservoir in the direction of the production well.

The pressure difference between the injection well and the production well will guide the injection fluid from the injection well to the production well. In the light of this, the guiding by pressure difference hereby creates the underground water stream from the injection well to the production well.

In an example embodiment of the invention, several injection wells and production wells participate in the creation of the underground water stream. By positioning the injection and production wells correctly and by controlling the injection or recovery rate in each well, the underground water stream can be guided to flow in the direction wanted.

One advantage of the invention is that by adding enzymes to the injection water, these will when carried by the injection fluid interact with hydrocarbons in the underground and increase the release of the hydrocarbons from the rock formations into the injection fluid. I.e. the injection water (by volume the main constituent of the injection fluid) works to displace the hydrocarbons in the reservoir, and it serves as carrier of the enzymes, which releases the hydrocarbons by means of chemical, bio-chemical or physical interactions.

According to a preferred example embodiment of the invention, the injection of injection fluid is performed substantially constant. However, the injection may be interrupted for shorter periods, e.g. because of maintenance of equipment or scheduled checks. According to this example embodiment, the injection will, over a month, be performed at least 95-99% of the time.

According to an example embodiment of the invention the injection pump system may comprise one or more turbine driven pumps. These pumps may in an example embodiment be a pump from manufacturers such as Solar Gas or Siemens. The pressure of the injection fluid at the point where it meets the reservoir may e.g. be between 1700 and 2900 psi. The pressure referred to here is the hydrostatic pressure.

Functionality of the Enzyme

Enzymes are complex protein molecules that work as biochemical catalysts to lower the activation energy of the reaction which they catalyze. Being a catalyst and not a reactant, an enzyme molecule can participate in the same kind of reaction many times. In principle there is no limit to the number of catalytic cycles they can participate in, but there is always a finite probability that the enzyme will become inactivated or destroyed, e.g. if the temperature is too high. Because enzymes have a complex protein structure, they are relatively expensive and some enzymes are relatively fragile.

The functionality of the enzymes injected into the underground reservoir may be to assist in the release of hydrocarbons from the rocks of the underground reservoir into the underground water stream 4. The enzymes may also increase the flow of the hydrocarbons through the underground reservoir by modifying the characteristics such as surface tension and/or viscosity of the hydrocarbons.

Furthermore, the functionality of the enzymes can be carbon-carbon bond scissoring with the purpose of downhole upgrading of the oil.

In order to achieve the wanted effect of the enzymes in the underground water stream, the concentration of the enzymes must be sufficiently high.

Enzymes may be designed specifically for a purpose. Numerous variations of enzymes may be applied within the scope of the invention. Examples of applicable enzymes are given in WO 2010/008750 hereby included by reference. Specific examples include non-heme haloperoxidases such as chloroperidases, bromoperoxidases or iodoperoxidases.

According to embodiments of the present invention, the second injection stream 2 may comprise a mixture of two or more different enzymes.

LIST OF FIGURE REFERENCES

1 First continuous injection stream (essentially water based)
2 Second continuous injection stream
3 Final injection stream
4 Underground water stream (UWS)
5 Recovered stream
6 Ground
7 Mixing unit/reactor
8 Injection unit
9 Underground reservoir (UR)
10 Point source (for fluid injection)
11 Circles illustrating circular fluid fronts
12 Lines illustrating linear fluid fronts
13 Part of the injection stream lost to the reservoir
14 Contribution to the underground water stream coming from the reservoir
15 Subsurface oil stream
16 Recovered oil stream
17 Recovery unit
18 Off-shore oil platform
19 Platform leg
20 Water surface
21 Service deck
22 Utility deck
23 Helipad
IPS Injection pump system
CFPS Carrier fluid pump system
PSS Power supply system
EPS Enzyme pump system
FIS First injection stream
SIS Second injection stream
IW Injection well
PW Production well
LO Liquid output

The invention claimed is:

1. A method of establishing an enhanced oil recovery in an underground reservoir by means of a recovery system, the recovery system comprising at least one injection well and at least one production well,
   the at least one injection well comprising an injection pump system,
   the injection pump system establishing an injection stream having a pressure between 1700 and 2900 psi at a point where it meets the underground reservoir, the injection stream comprising a first injection stream and a second injection stream,
   wherein said injection stream comprises enzyme added at the at least one injection well,
   the injection pump system establishing an injection stream through the at least one injection well,
   the injection pump system being coupled with a power supply system,
   the at least one production well comprising at least one fluid output,
   the at least one injection well and the at least one production well actively establishing an underground water stream, the underground water stream being established in response to pressure established by the injection pump system,
   the underground water stream comprising water injected by injection pump system, the injection stream having an enzyme concentration $C_{en,3}$,
   where the enzyme concentration $C_{en,3}$ of said injection stream is set to between 0.005% and 0.5% by weight using the formula $$C_{en,3} = \left( \frac{C_{en,1} \cdot S_1 + C_{en,2} \cdot S_2}{S_1 + S_2} \right),$$

where $C_{en,1}$ and $C_{en,2}$ are the enzyme concentration of the first and second injection stream respectively, $S_1$ and $S_2$ are flow rates of the first and second injection streams respectively, wherein the injection pump system comprises two pump systems, a carrier fluid pump system and an enzyme pump system, the carrier fluid pump system establishing a first injection stream comprising water, the enzyme pump system establishing a second injection stream comprising enzyme, wherein the underground water stream comprises water injected by the carrier fluid pump system and enzyme injected by the enzyme pump system.

2. The method of establishing an enhanced oil recovery in an underground reservoir according to claim 1, whereby the first and second injection streams are continuously mixed and injected into the underground reservoir.

3. The method of establishing an enhanced oil recovery in an underground reservoir according to claim 1, whereby the first and second injection streams are continuously mixed and injected into the underground reservoir and where the enzyme concentration in the injection streams is between 0.005% and 0.5% by weight per month.

4. The method of establishing an enhanced oil recovery in an underground reservoir according to claim 1, whereby the enzyme concentration in the injection stream is reduced gradually over a period of at least one year.

5. The method of establishing an enhanced oil recovery in an underground reservoir according to claim 1, further comprising the step of mixing of the second injection stream and the first injection stream prior to injection.

6. The method of establishing an enhanced oil recovery in an underground reservoir according to claim 1, wherein the method is applied in an off-shore well.

7. The method of establishing an enhanced oil recovery in an underground reservoir according to claim 1, wherein the recovery system comprises a plurality of injection wells and a plurality of production wells.

8. The method of establishing an enhanced oil recovery according to claim 1, wherein the underground water stream is established at least partly by means of at least one pump.

9. The method of establishing an enhanced oil recovery according to claim 1, wherein the underground water stream is established at least partly by means of at least one injection pump.

10. The method of establishing an enhanced oil recovery according to claim 1, whereby the enzyme is transported from at least one injection well to at least one production well.

11. The method of establishing an enhanced oil recovery according to claim 1, whereby the enzyme is transported from one well to another by means of a continuous water stream.

12. The method of establishing an enhanced oil recovery according to claim 1, whereby the at least one injection well and at least one production well are physically separated, horizontally or laterally.

13. The method of establishing an enhanced oil recovery according to claim 1, wherein the at least one injection well and the at least one production well are located in a reservoir and wherein an underground output of the at least one injection well is distant to an oil reservoir output from the at least one production well.

14. The method of establishing an enhanced oil recovery according to claim 1, wherein a distance between the at least one injection well and the at least one production well is at least 150 feet.

15. The method of establishing an enhanced oil recovery according to claim 1, wherein the injection stream has an injection rate, and wherein the injection rate is at least 60000 barrels per month.

16. The method of establishing an enhanced oil recovery according to claim 1, wherein the injection pump system comprises at least one turbine driven pump.

17. The method of establishing an enhanced oil recovery according to claim 1, wherein said enzyme is selected from the group consisting of oil viscosity lowering enzymes, oil surface tension reducing enzymes, carbon-carbon bond scissoring enzymes, oil-wet altering enzymes, emulsifying enzymes, and any combination thereof.

18. A method of establishing an enhanced oil recovery in an underground reservoir comprising the steps of:
providing at least one injection well having an injection pump system coupled to a power supply system and at least one production well having at least one fluid output, the injection pump system comprising a carrier fluid pump system and an enzyme pump system;
establishing a final injection stream through the at least one injection well, the final injection stream comprising a first injection stream established by the carrier fluid pump and a second injection stream established by the enzyme pump system;
adding an enzyme to the final injection stream in the at least one injection well;
establishing an underground water stream comprising water injected by the injection pump system using the at least one injection well and the at least one production well in response to pressure established by the injection pump system; and
setting enzyme concentration $C_{en,3}$ of the final injection stream to between greater than 0% and less than 0.5% by weight using enzyme concentration $C_{en,1}$ of the first injection stream, enzyme concentration $C_{en,2}$ of the second injection stream, flow rate $S_1$ of the first injection stream, and flow rate $S_2$ of the second injection stream using the formula $$C_{en,3} = \left( \frac{C_{en,1} \cdot S_1 + C_{en,2} \cdot S_2}{S_1 + S_2} \right);$$

wherein the underground water stream comprises fluid injected by the carrier fluid pump system and enzyme solution injected by the enzyme pump system.

19. A system for enhanced oil recovery in an underground reservoir comprising:
at least one injection well having an injection pump system coupled to a power supply system for establishing an injection stream, the injection pump system comprising a carrier fluid pump system and an enzyme pump system;
at least one production well having at least one fluid output;
a mixed injection stream through the at least one injection well comprising a first injection stream comprising water having a flow rate $S_1$ produced by the carrier pump system and a second injection stream comprising enzyme and water having a flow rate $S_2$ produced by the enzyme pump system;

enzyme at a concentration $C_{en,3}$ in the mixed injection stream, the concentration of the enzyme $C_{en,3}$ set to between greater than 0% and less than 0.5% by weight using the formula $$C_{en,3} = \left(\frac{C_{en,1} \cdot S_1 + C_{en,2} \cdot S_2}{S_1 + S_2}\right),$$

where $C_{en,1}$ and $C_{en,2}$ are the enzyme concentration of the first and second injection stream, respectively; and an underground water stream in fluid connection with the at least one injection well and the at least one production well, the underground water stream comprising water injected by the carrier fluid pump system and enzyme solution injected by the enzyme pump system.

* * * * *